United States Patent [19]

Hatano et al.

[11] Patent Number: 5,078,256
[45] Date of Patent: Jan. 7, 1992

[54] MACHINE TOOL HAVING A CHIP COLLECTING APPARATUS

[75] Inventors: Sakae Hatano, Aichi; Yoshiharu Takada, Chiba; Kiyokazu Kainuma, Aichi; Isao Kanematsu, Aichi; Kazuo Asano, Aichi; Hisashi Yoshida, Aichi; Yoshinori Mori, Gifu, all of Japan

[73] Assignee: Yamazaki Mazak Corporation, Aichi, Japan

[21] Appl. No.: 461,550

[22] Filed: Jan. 5, 1990

Related U.S. Application Data

[62] Division of Ser. No. 227,881, Aug. 3, 1988.

[30] Foreign Application Priority Data

| Aug. 4, 1987 | [JP] | Japan | 62-119484 |
| Aug. 4, 1987 | [JP] | Japan | 62-119485 |
| Aug. 4, 1987 | [JP] | Japan | 62-119486 |
| Aug. 4, 1987 | [JP] | Japan | 62-194766 |
| Nov. 17, 1987 | [JP] | Japan | 62-175713 |

[51] Int. Cl.$^5$ ............................................. B65G 47/46
[52] U.S. Cl. ................................. 198/360; 51/270; 409/137; 29/DIG. 53
[58] Field of Search ................. 198/360; 51/270; 408/67, 68; 409/137; 29/DIG. 52, 53, DIG. 61, 77, DIG. 79, 94, DIG. 102

[56] References Cited

U.S. PATENT DOCUMENTS

| 771,836 | 10/1904 | Schantz | 29/DIG. 53 |
| 1,616,151 | 2/1927 | Thacher | 29/DIG. 53 |
| 2,124,216 | 7/1938 | Tessky | 29/DIG. 53 |
| 3,098,332 | 7/1963 | Sutton | 51/270 |
| 4,804,078 | 2/1989 | Scata | 198/360 |

FOREIGN PATENT DOCUMENTS

| 124542 | 7/1984 | Japan | 409/137 |
| 2154914 | 9/1985 | United Kingdom | 409/137 |

*Primary Examiner*—Joseph E. Valenza
*Attorney, Agent, or Firm*—Wenderoth, Lind & Ponack

[57] ABSTRACT

A chip collecting apparatus for a machine tool has two separate chip conveyors for chips of different materials. The chip collecting apparatus receives chips on fixed guide plates. Chips are washed from the fixed guide plates into a chip collecting area. In the chip collecting area is disposed a change-over plate for directing the chips from the guide plates onto either one of the chip conveyors. The change-over plate is pivotably moveable between different positions corresponding to the respective chip conveyors. In an alternative embodiment, only one chip conveyor is used, and the change-over plate is provided at the discharge end of the conveyor to discharge chips into either one of two chip collecting bins.

3 Claims, 3 Drawing Sheets

MACHINE TOOL HAVING A CHIP COLLECTING APPARATUS

This application is a divisional application of application Ser. No. 07/227,881 filed Aug. 3, 1988.

BACKGROUND OF THE INVENTION

This invention relates to a chip collecting apparatus used for a machine tool such as a lathe, and a method of collecting chips.

In a conventional machine tool such a lathe, when the machining is performed on workpieces of different kinds of materials, differentiation of machining is not present, except for specific cases. Therefore, when the chip produced is collected it mixes with different kinds of chips.

This method is defective in the complication of the separation and classification of chips, for the object of effectively utilizing resources. In the case where a workpiece machined is completely different in character, such as metal and ceramic, a chip collecting apparatus capable of collecting and classifying the chip produced from the first is desirable.

OBJECTS OF THE INVENTION

It is an object of the present invention to provide a chip collecting apparatus capable of easily classifying and stocking the chip produced if the material to be machined changes.

SUMMARY OF THE INVENTION

Moreover, according to the present invention, a change-over plate is provided, being free to rotate and move in reciprocal directions at a chip collecting side such as a machine tool side, or at a chip elimination side such as a chip elimination orifice of a chip conveyor. A driving means for rotating and moving the change-over plate, such as a driving cylinder, are provided with the change-over plate.

With the above-described constitution, a chip different in material can be collected, properly sorting chips in such a manner that the driving means is driven according to the material to be machined to switch the change-over plate to reciprocal directions.

Accordingly, the collection and separation of chips can be easily performed, the reclamation of resources can be promoted, and chips different in properties such as ceramic and metal chips can be collected with an initial sorting operation.

DESCRIPTION OF THE PREFERRED EMBODIMENTS

The present invention will be described in detail hereunder with reference to the accompanying drawings.

Figure 1:
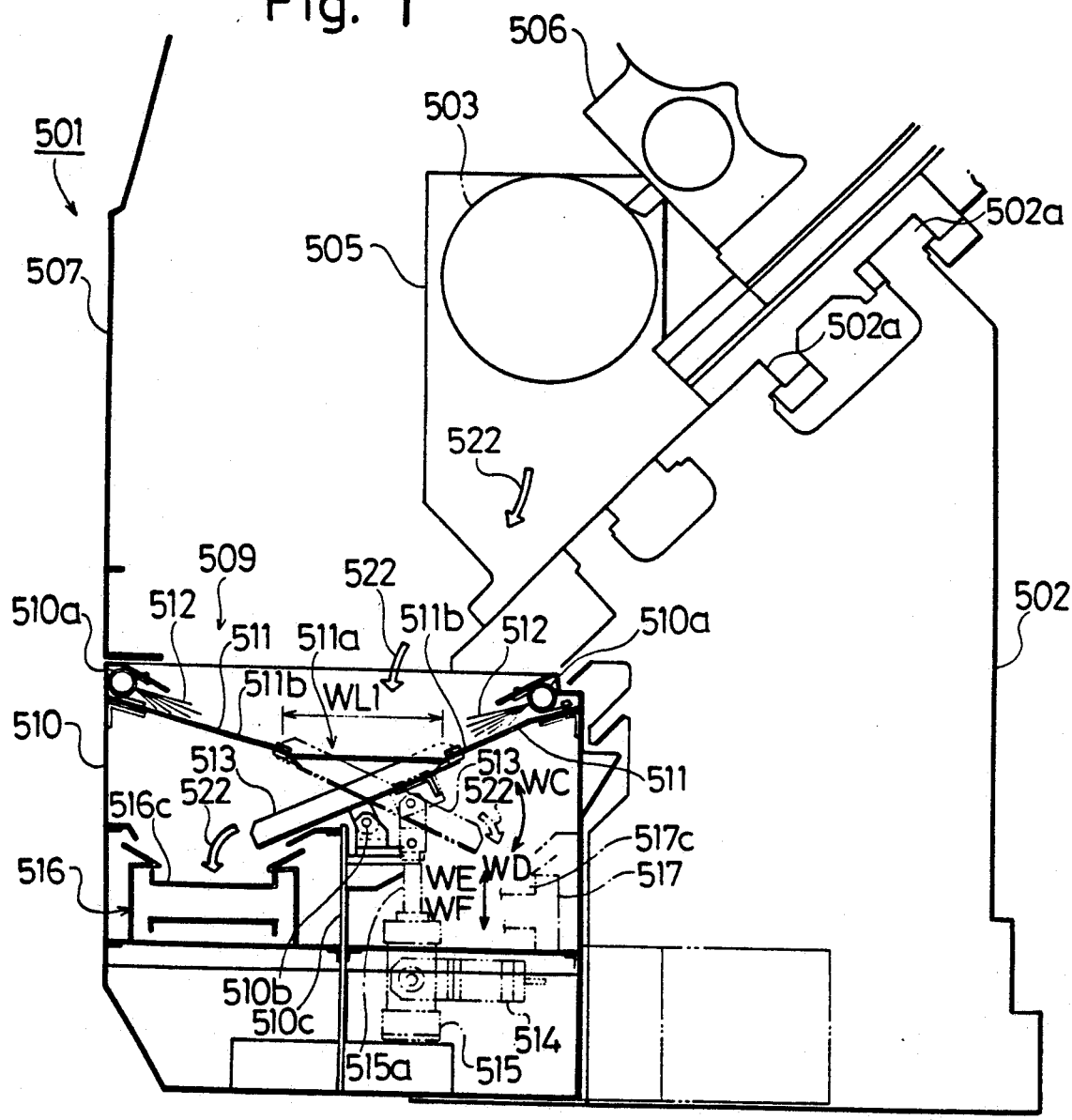
FIG. 1 is a sectional view showing an embodiment of a chip collection apparatus according to the present invention.

A machine tool 501, such as a lathe, has a bed 502 as shown in FIG. 1. A spindle stock 505, by which a workpiece spindle 503 is rotatably supported, is provided on the bed 502. A guide rail 502a is formed on the bed 502 in a direction perpendicular to the paper of the Figure (the Z axis direction), and a tool rest 506 for having a tool installed thereon is movably supported by the guide rail 502a. A cover 507 is provided on a front face of the bed 502, that is to say, the left side of the Figure, covering the whole machine tool 501. A chip collecting apparatus 509 according to the present invention is provided at the lower end of the cover 507 in the Figure, at the front of the bed 502.

Figure 2:
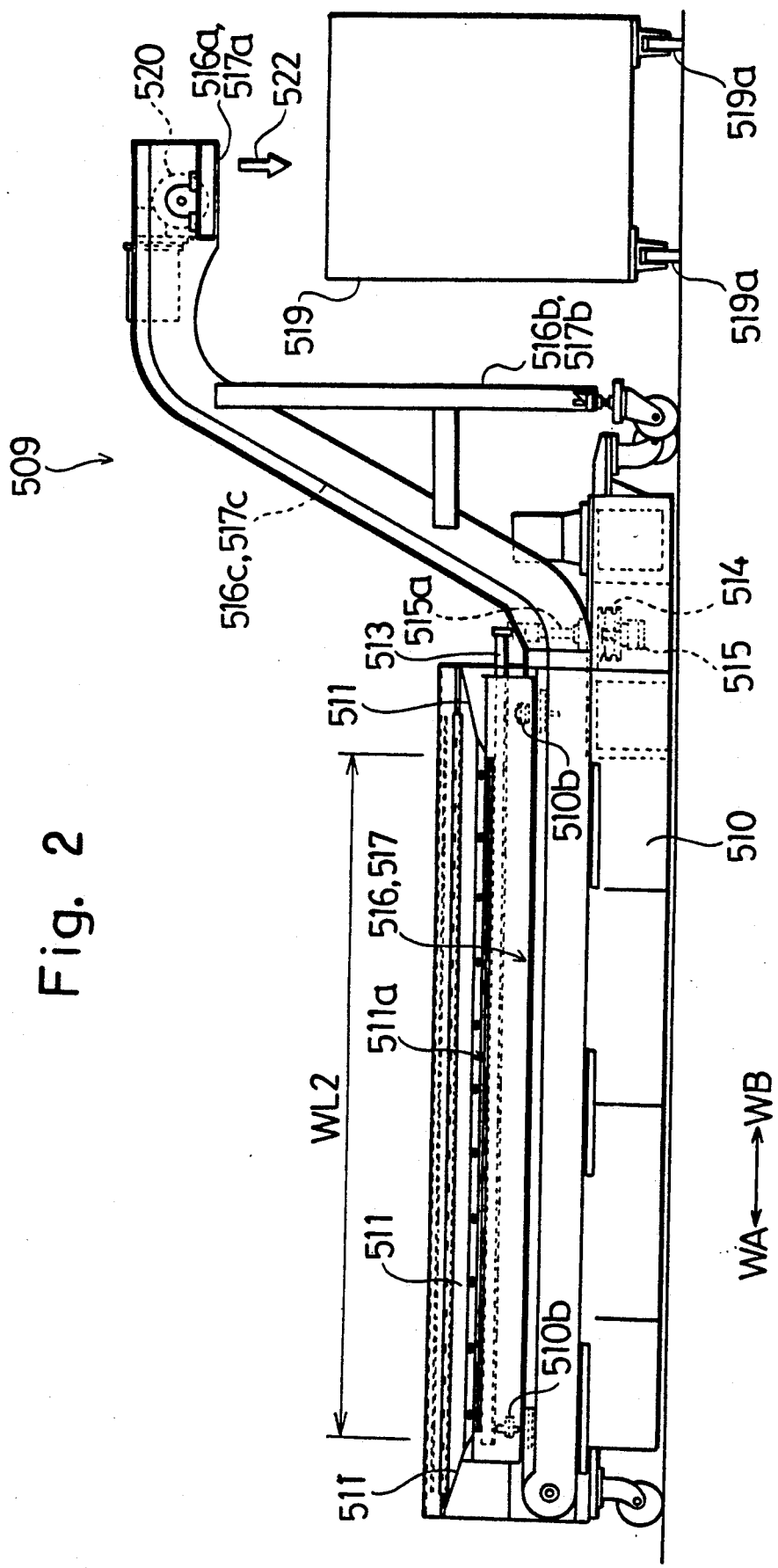
FIG. 2 is a front elevation of the chip collecting and apparatus of FIG. 1.

The chip collecting apparatus 509 has a frame 510 which is formed as a whole in a box shape as shown in FIG. 1 and FIG. 2. Chip pans 511 are disposed on the upper portion of the frame 510 in FIG. 1, facing each other in a direction perpendicular to the paper in FIG. 1, that is, in the directions as shown by arrows WA and WB in FIG. 2. The chip pans 511 are formed obliquely in such a manner that the nearer portion to the center portion in FIG. 1 becomes lower, in the shape of a funnel as a whole, as shown in FIG. 2. A chip falling space 511a is formed at the center, having a width WL1 and a length WL2. Washing pipes 510a are formed at both sides of the chip pans 511 in FIG. 1 along the chip pans 511 in the direction perpendicular to the paper. A number of discharge holes, which are not shown in the Figure, are provided on each washing pipe 510a facing in the direction of the chip pans 511 in order to discharge a coolant 512 washing toward a chip pan face 511b.

At the lower portion of the chip falling space 511a in FIG. 1, a change-over plate 513, extending over the entire length in the directions as shown by the arrows WA and WB in FIG. 2, is supported at both its sides via pins 510b on the frame 510, the change-over plate 513 being free to rotate and move in the directions as shown by the arrows WC and WD in FIG. 1. A driving cylinder 515 is provided near the pin 510b on the right side in FIG. 2 of the change-over plate 513 via bracket 514 fixed to the frame 510 between the change-over plate 513 and the frame 510. A rod 515a is provided with the driving cylinder 515, being free to project and drive in the directions as shown by the arrows WE and WF, and the top end of the rod 515a is connected with the change-over plate 513 such that the change-over plate 513 is free to rotate and move.

A pair of chip conveyors 516 and 517 are disposed at below the change-over plate 513 in FIG. 1 via a partition plate 510c, conveying in the directions as shown by the arrows WA and WB (only a part of the chip conveyor 517 is shown in FIG. 1). The chip conveyors 516 and 517 project from the right side face of the frame 510 in the Figure to the outside, stretching to the right in FIG. 2 in the frame 510. The chip conveyors 516 and 517 extend in a gentle S-form at the upper portion of the Figure, being supported by legs 516b and 517b, and chip elimination orifices 516a and 517a are provided at the upper end, opening downward in the Figure. Two chip boxes 519 are in a row in a direction perpendicular to the paper face in FIG. 2, and are provided below the chip elimination orifices 516a and 517a, the chip boxes 519 being free to move via wheel 519a provided on the lower surfaces of the chip boxes 519. On the chip conveyors 516 and 517, belts 516c and 517c, having a edge and being provided for delivering the chips, are disposed between the left end portion of the frame 510 in FIG. 2 and the chip elimination orifices 516a and 517a of the chip conveyors 516 and 517, that is, in the directions as shown by the arrows WA and WB along the frame 510. Motors 520 are disposed at the end of the chip elimination orifices 516a and 517a. The motors 520 are provided for the respective chip conveyors 516 and 517. Therefore, the chip conveyors 516 and 517 can be selectively driven by selectively driving the motors 520.

With the above-described constitution of the machine tool 501 and the chip collecting apparatus 509, in case a workpiece which is composed of a first material is machined by means of the machine tool 501, the workpiece is installed in the workpiece spindle 503 of the spindle stock 505. In this state, the predetermined machining, such as turning, grinding and milling machining, is performed by means of the tool installed in the tool rest 506 in such a manner that the workpiece spindle 503 is rotated together with the workpiece. Chips 522 which are generated during the machining fall to the lower portion in FIG. 1 of the bed 502 and fall on the chip pans 511 of the chip collecting apparatus 509. A coolant 512 is always spouted from the washing pipe 510a to the chip pans 511, and the chips 522 which fall on the chip pans 511 are moved by being washed down, and fall into the chip falling space 511a formed at the center portion of the chip pan 511 by means of the spouting coolant 512.

The chips 522 which flow together with the coolant 512 into the chip falling space 511a fall on the change-over plate 513. At this point the change-over plate 513 is in a state in which the rod 515a of the driving cylinder 515 is projected in the direction as shown by the arrow WE. Accordingly, the change-over plate 513 is n a state rotated and moved on the pins 510b as its center in the direction as shown by the arrow WC. Then the chip falling space 511a is in a state communicating with the chip conveyor 516 on the left side in FIG. 1, and the chips 522 which fall on the change-over plate 513 fall on the belt 516c of the chip conveyor 516 by means of the coolant 512. The coolant 512 passes through the chip conveyor 516 and is retrieved in a drain tank, which is not shown in the Figure, and is fed to the washing pipe 510a by a circulating pump for reclamation. Moreover, when the coolant 512 falls toward the lower portion of FIG. 1 from the chip conveyor 516, the chips 522 remain on the belt 516c of the chip conveyor 516. Then the motor 620 of the chip conveyor 516 is rotated and driven, the belt 516c is moved and driven between the chip elimination orifice 516a and the chip falling space 511a, the chips 522 which fall on the belt 516c is conveyed to the chip elimination orifice 516a, and the chips 522 are discharged into the chip box 519 disposed below the elimination orifice 516a.

In this way, while the workpiece which is composed of one kind of material is being machined, the change-over plate 513 is kept in a state rotated and moved in the direction as shown by the arrow Wc in FIG. 1, and all the chips 522 which are generated during machining fall to the chip conveyor 516 side and are retrieved.

In case the material of a workpiece to be machined changes from the first material into a second material, before the start of machining, the coolant 512 is flowed via the washing pipe 510a and the chips 522 which adhere to the chip pans 511 and which are composed of the first material are washed down, falling to the chip conveyor 516 side. When this washing operation finishes, the rod 515a of the driving cylinder 515 is retracted in the direction as shown by the arrow WF. Then the change-over plate 513 rotates and moves with retraction of the rod 515a on the pins 510b in the direction as shown by the arrow WD, the communication between the chip falling space 511a and the chip conveyor 516 being broken, and the chip falling space 511a and the chip conveyor 517 are communicated with each other.

In this state the motor 520 of the chip conveyor 517 side is rotated and driven, the belt 517c of the chip conveyor 517 side is driven, and the machining of the workpiece of the second material, which is different from the prior material, is started. Then the chips 522 which are generated during machining fall from the chip pans 511 to the change-over plate 513, being washed and flowing down by means of the coolant 512 as described before. Moreover, the chips 522 are discharged from the change-over plate 513 to the chip conveyor 517 side and are expelled from the chip elimination orifice 517a into the other chip box 519 disposed below the elimination orifice 517a by the same procedure.

In case the workpiece which is composed of the first material is machined again when the machining of the workpiece being different in material has been performed and the machining finishes, as in the above-described case, washing by the washing pipe 510a is performed for a predetermined time, and thereafter the driving cylinder 515 is again driven to rotate and move the change-over plate 513 in the direction as shown by the arrow WC. The chip falling space 511a and the chip conveyor 516 are communicated with each other, and the communicating state is broken between the chip conveyor 517 and the chip falling space 511a. In this state, when the machining is started on the workpiece of the first material, the chips 522 fall to the chip conveyor 516 side by the change-over plate 513 and are stored in the chip box 519 in which the chips 522 were stored when the machining of the workpiece of the first material was last performed.

In the above-described embodiment, it was mentioned that the change-over plate 513 is provided at the machine tool side of the chip collecting apparatus 509, that is to say, at the chip collection side. However, the installation position of the change-over plate 513 is not restricted to the chip collection side. The change-over plate 513 can of course be provided at the chip elimination orifice side, at which the chips are thrown in the chip boxes. The case in which the change-over plate is provided at the chip elimination orifice side will be explained in FIG. 3 hereinafter. The explanation of portions similar to the arrangement of FIGS. 1 and 2 is omitted by using the same reference numerals.

Figure 3:
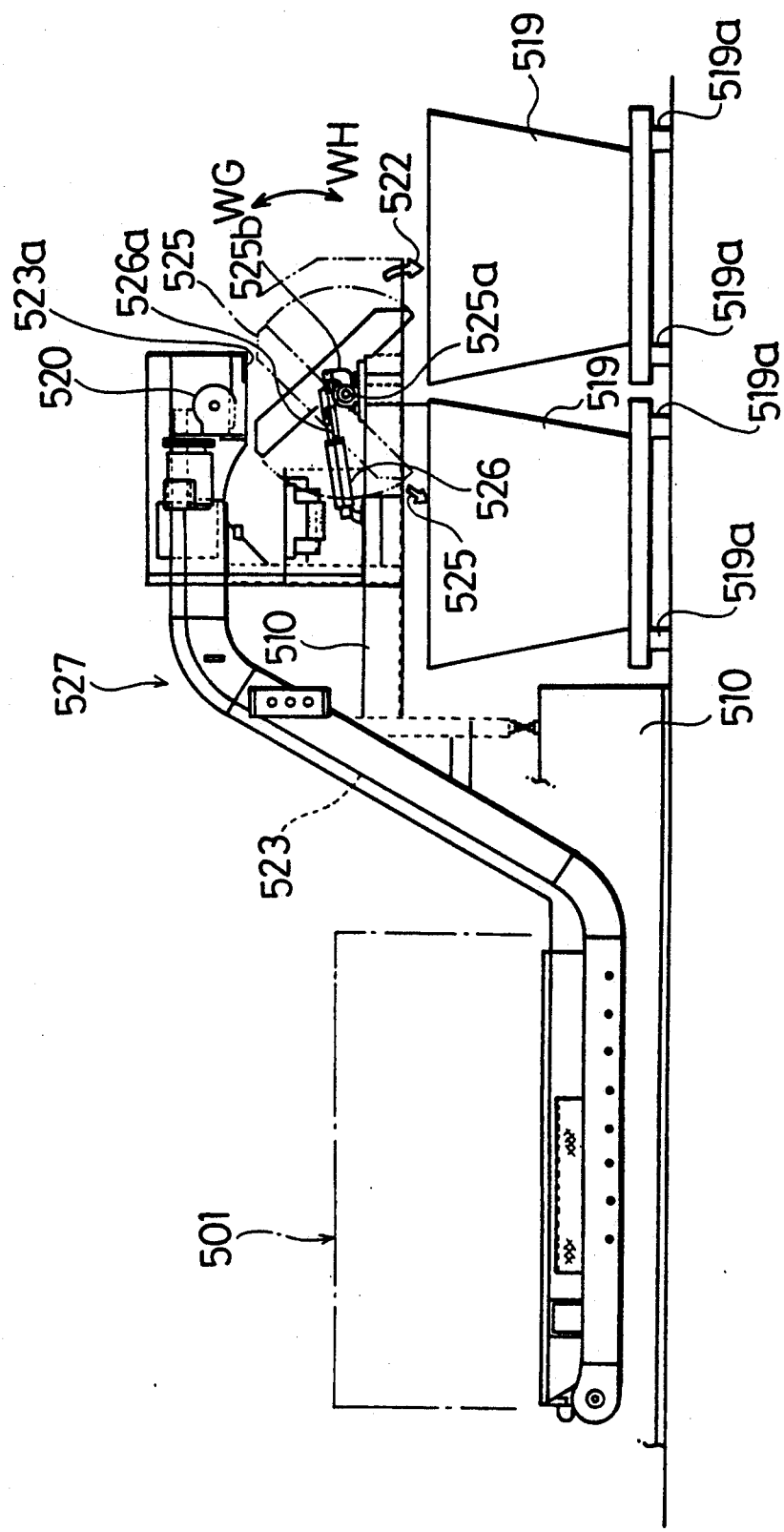
FIG. 3 is a front elevation for showing another embodiment of a chip collecting apparatus.

A chip collecting apparatus 527 has a chip conveyor 523 as shown in FIG. 3. Only one chip conveyor is provided. This is different from the prior case in FIG. 1. Below a chip elimination orifice 523a of the chip conveyor 523, a change-over plate 525 is supported by the frame 510, being free to rotate and move in the directions as shown by the arrows WG and WH via a shaft 525a. An arm 525b is provided on one end of the shaft 525a. The top end of a rod 526a of a driving cylinder 526 rotatably supported by the frame 510 is connected to the arm 525b so as to be free to rotate and move. Moreover, two chip boxes 519 are disposed at the lower portion of the change-over plate 525 in the Figure.

With the above-described constitution of the chip collecting apparatus 527, the chips 522 which are generated at the machine tool 501 fall together with coolant onto the chip conveyor 523 in the frame 510 as a regular chip collecting apparatus. Only chips 522 are conveyed to the chip elimination orifice 523a side provided at the upper right portion of the Figure, the chips 522 being separated from the coolant by means of the chip conveyor 523. The chips 522 which are conveyed to the chip elimination orifice 523a fall and are expelled onto the change-over plate 525 immediately. Regarding the change-over plate 525, the rod 526a of the driving cylinder 526 is properly projected and retracted according to the material of the workpiece which is being machined by the machine tool 501. When the rod 526a projects, the change-over plate 525 rotates and moves via the shaft 525a in the direction as shown by the arrow WH, and the chip elimination orifice 523a is connected with the chip box 519 at the right side of the Figure. When the rod 526a retracts, the change-over plate 52 rotates and moves via the shaft 525a in the direction a shown by the arrow WG, and the chip elimination orifice 523a is connected with the chip box 519 at the left side of the Figure. Accordingly, the chips 522 are thrown and stored in the chip boxes 519 according to the material in such a manner that the driving cylinder 526 is driven on the basis of either manual operation or a machining program whenever the material of the workpiece to be machined changes, and the change-over plate 525 is properly switched in direction as shown by the arrow WG or WH.

The present invention has been explained on the basis of the embodiments presented herein. However, the embodiments which are described in the present specification are illustrative and not limiting. The scope of the invention is designated by the accompanying claims and is not restricted by the description of the specific embodiments. Accordingly, all the transformations and changes belonging to the claims are included in the scope of the present invention.

We claim:

1. A chip collecting apparatus, comprising:
   a frame;
   a fixed guide plate for receiving chips thereon provided on said frame, said fixed guide plate extending obliquely downward, and a chip falling space being defined below said fixed guide plate;
   a washing means disposed at an upper portion of said fixed guide plate for supplying washing liquid to the surface of said fixed guide plate for washing chips on said fixed guide plate into said chip falling space;
   two selectively drivable chip conveyors disposed parallel to each other at a lower portion of said chip falling space;
   a change-over plate having a pivot connected at a midpoint thereof pivotably disposed in said chip falling space for pivoting movement in opposite directions between a first position directing chips onto one said chip conveyor and a second position directing chips onto the other said chip conveyor; and
   a means for pivotably driving said change-over plate between said first and second position, said means for pivotably driving said change-over plate comprising a piston and cylinder connected to said change-over plate.

2. The chip collecting apparatus as set forth in claim 1, and further comprising:
   a second fixed guide plate for receiving chips thereon provided on said frame, said change-over plate being pivotably disposed in said chip falling space between said fixed guide plates.

3. The chip collecting apparatus as set forth in claim 2, wherein said fixed guide plates extend longitudinally parallel to said chip conveyors, and said change-over plate extends longitudinally parallel to said chip conveyors and said fixed guide plates.

* * * * *